United States Patent [19]

Morel

[11] 4,218,954
[45] Aug. 26, 1980

[54] SCREW FASTENER FOR A ROUND HOLE

[75] Inventor: Henri Morel, Maule, France

[73] Assignee: ITW de France, Beauchamp Val d'Oise, France

[21] Appl. No.: 949,308

[22] Filed: Oct. 6, 1978

[30] Foreign Application Priority Data

Dec. 26, 1977 [FR] France .................. 77 39170

[51] Int. Cl.² ........................................... F16B 13/06
[52] U.S. Cl. ............................................ 85/81; 85/72
[58] Field of Search ................ 85/80, 81, 82, 83, 84, 85/5 R, 70, 71, 72; 151/41.75; 24/73 P, 73 PM, 208 A

[56] References Cited

U.S. PATENT DOCUMENTS

| | | | |
|---|---|---|---|
| 2,887,926 | 5/1959 | Edwards | 85/70 |
| 3,144,695 | 8/1964 | Budwig | 85/84 X |
| 3,678,798 | 7/1972 | Van Niel | 85/81 |
| 3,739,684 | 6/1973 | Vitrevich | 85/84 X |

FOREIGN PATENT DOCUMENTS 653957 1/1965 France .................. 85/72

*Primary Examiner*—Ramon S. Britts
*Attorney, Agent, or Firm*—Jack R. Halvorsen; Robert W. Beart

[57] ABSTRACT

Fastening device of plastics material for a round hole, designed to receive a screw enabling mounting with a high gripping torque and this even in thin sheet metal. It includes a principal element capable of becoming clipped in a round hole of a support and a complementary element which is engaged in the upper portion of the first element. A mounting screw passes through the element and becomes self-tapping in the lower portion of the body. The advance of the screw causes, at the same time, the descent of the wedge and the reascent of the low portion of the principal element, which results in gripping expansion of the whole within the hole. The invention can be used for the mounting of any parts by means of a screw in a member clipped in a round hole with high gripping torque.

9 Claims, 16 Drawing Figures

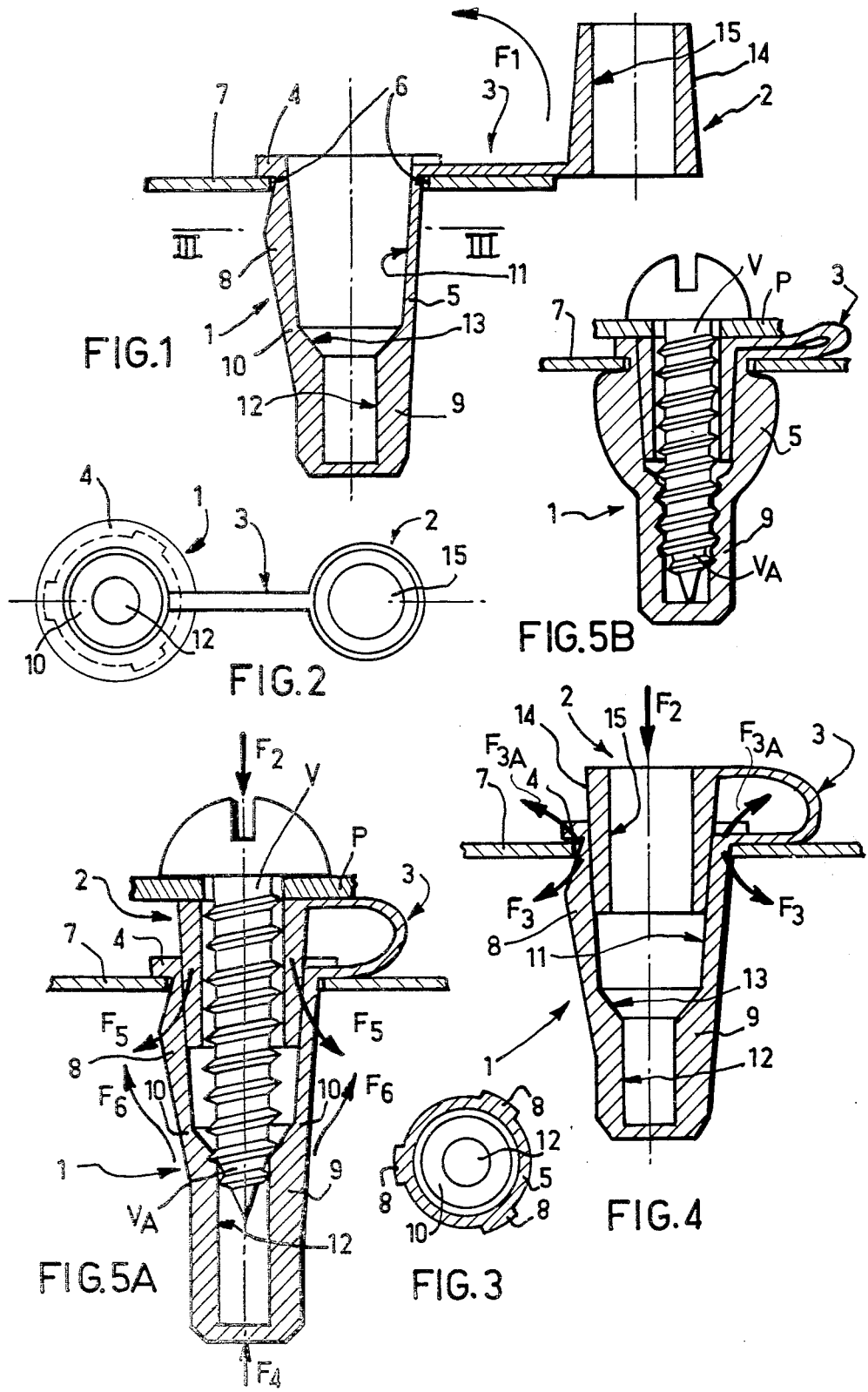

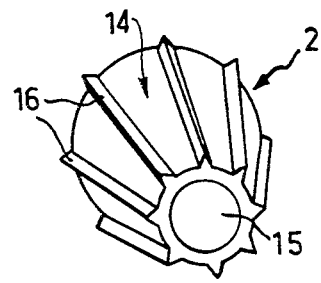
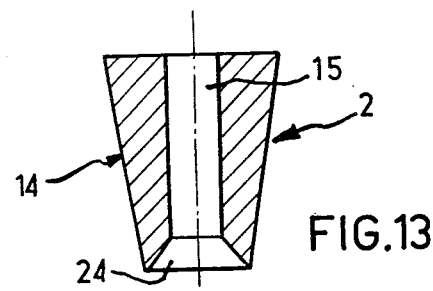
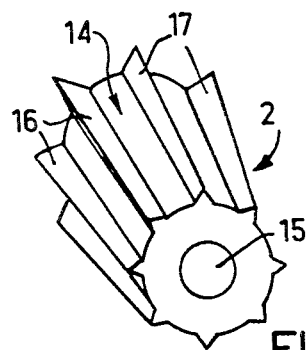
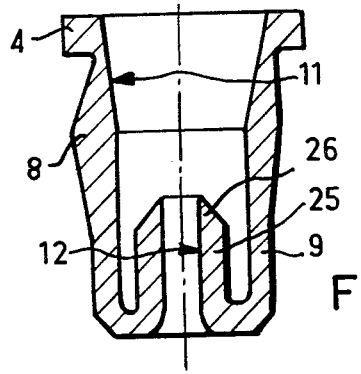
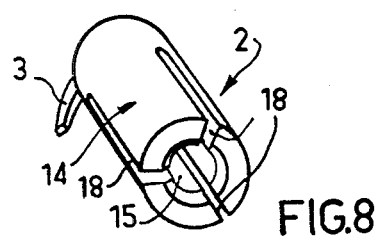
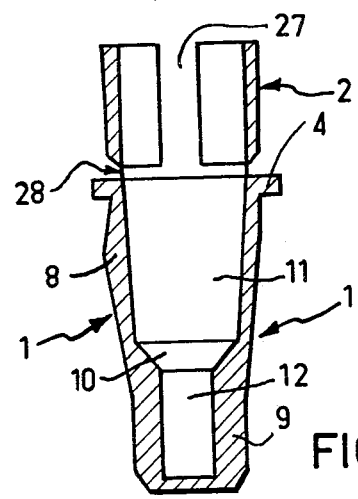
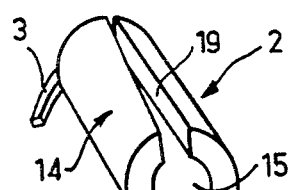
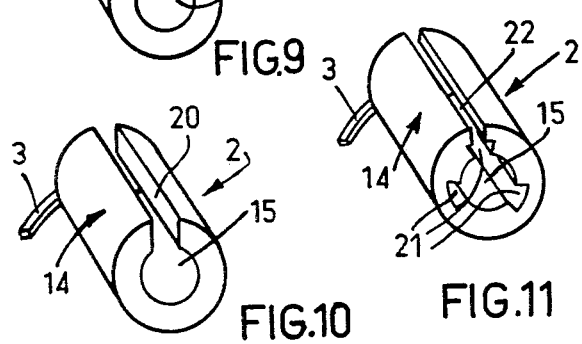
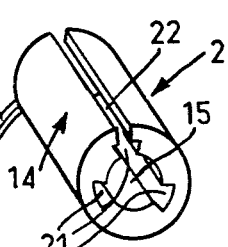
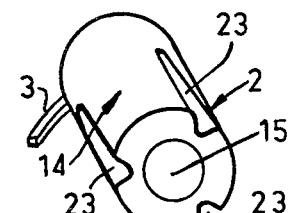

SCREW FASTENER FOR A ROUND HOLE

BACKGROUND OF THE INVENTION

1. Field of the Invention

The invention relates generally to fastening devices for round holes and notably to fastening devices of plastics material designed to receive screws for assembling parts to supports.

2. Description of the Prior Art

The problem with prior art types of fastening devices of this type is to prevent their rotation during assembly. To this end it is customary to form openings other than round in the supports.

When the opening is round, it is known at the present time, to fix the fastening members, to glue them to the supports by adhesive or again to prevent their rotation, by the use either of a rough surface or of stubs. More recently, solutions by eccentricity of the screw have been suggested but they do not give entire satisfaction.

It is an object therefore of the present invention to provide a fastening device of plastics material for a round hole, designed to receive a screw, without eccentricity nor immobilization, and this in such a way that it permits mounting with a high gripping torque and this even in thin sheet metal or parts of little thickness.

GENERAL DESCRIPTION OF THE INVENTION

The fastening device according to the invention is characterized essentially by the fact that it is constituted by a hollow tubular element capable of being clipped in the round hole of a support or of any part and of receiving in its upper portion a wedge-forming complementary element so that it causes, progressively with its penetration, the expansion of the element clippable in the round hole, the thus-constituted assembly forming a nut capable of receiving a mounting screw passing freely through a suitable bore of the complementary wedge so as to tap the lower portion of the element clipped in the hole, in such manner that the force opposing the screwing torque is obtained by the screwing itself, causing simultaneously the descent of the complementary wedge and the reascent of the lower portion of the clipped element, and, consequently, the increase in the gripping expansion of the body clipped in the hole.

According to another feature of the invention, the resistance to the screwing torque is completed by the fact that additional means are provided of preventing the complementary wedge from rotating inside the clippable body, in the course of the advance of the mounting screw in said clippable body.

Fluid-tightness may also be obtained in all the parts according to the invention by adapting the length of the lower portion which reascends and the length of the screw.

BRIEF DESCRIPTION OF THE DRAWINGS

Other features, advantages and particularities of the present invention will emerge from the description which is given below, with reference to the accompanying drawings showing, diagrammatically and simply by way of example, various possible embodiments of said invention which are of course, not to be regarded as limiting.

In the drawings:

FIG. 1 is a view in elevation-section of a screw fastener for a round hole according to the invention, of which the clippable element is positioned in the hole of a thin metal sheet;

FIG. 2 is a plan view of the device of FIG. 1;

FIG. 3 is a transverse sectional view of the clippable element, made along the line III—III of FIG. 1;

FIG. 4 is a view in elevation-section of the fastening device of FIG. 1, but the complementary wedge is shown in position inside the clippable element;

FIG. 5A is a view in elevation-section of the fastening device of FIG. 1, but the assembly screw being this time in the course of mounting and effecting the start of its tapping action;

FIG. 5B is a view in elevation-section similar to that of FIG. 5A but the mounting screw being this time fully in position;

FIGS. 6, 7, 8, 9, 10, 11 and 12 are detail views showing in perspective various possible embodiments of the complementary wedge;

FIGS. 13 and 14 are views in elevation-section of another possible modification, both of the complementary wedge and the clippable element; and FIG. 15 is a view in elevation-section of another possible embodiment of the fastening device according to the invention.

DESCRIPTION OF PREFERRED EMBODIMENTS

Referring first to FIGS. 1, 2 and 3, the screw fastening device for a round hole according to the invention is essentially constituted by a clippable element denoted by the general reference 1 and by a complementary wedge denoted by the general reference 2. To mold the set in a single injection and render the two parts fast to one another, it is advantageous to connect these two parts, for example by means of a bar denoted by the general reference 3.

More generally, the clippable element 1 comprises a head 4, a body 5 of any known outer shape to be adapted in the circular hole 6 of a metal sheet 7, said body being advantageously provided with longitudinal ribs such as 8 ensuring the clipping. These bodies are extended at the lower portion by a solid barrel 9 with an intermediate portion, in this particular case, a thinned zone 10. The interior includes a bore 11, for example conical, extended by a circular bore 12, these two bores being connected together by a frustoconic inlet 13 creating the thinning zone 10.

The complementary wedge 2 has an outer shape 14, preferably complementary with the first portion of the inner conical bore 11 of the body 5 and a circular internal bore 15.

For mounting, the clippable element 1 is adapted in the circular hole 6 formed in the support 7, until the head 4 comes to be borne on this support. The complementary wedge 2 is then made to pivot around the arrow $F_1$ to bring it, due to the flexibility of the bar 3 whose length is determined in consequence, facing the upper portion of the body 1. The complementary wedge 2 is then introduced along the arrow $F_2$ (FIG. 4) slightly gripped in the complementary portion 11. It is important to note that the slight gripping of the wedge 4 in the bore 11 causes sufficient swelling, shown diagrammatically by the arrows $F_3$ and $F_{3A}$, of the clippable body 1 on the hole 6 to render the whole fast to the support 7.

A screw V is then selected as a function of the nut thus produced to respond to the exigencies of the fastening of any given part, shown diagrammatically at P, on the support 7.

To this end, the screw V fixing the part P traverses, with slight play, the bore 15 of the complementary wedge 2 and then its point $V_A$ commences its tapping in the bore 12 of the solid barrel 9.

When the lower portion of the screw is thus anchored by self-tapping in the bore 12 of the barrel, it is clear that progressively with the advance of the screw, the latter tends to bring together simultaneously the wedge 2, which is moved in the direction $F_2$, and the solid barrel 9, which is moved in the direction $F_4$. The bringing together of these two elements creats two expansions of the clippable body 1, one inside the bore 11 caused by the wedge 2 and shown diagrammatically by the arrows $F_5$, the other outside through the barrel 9 and shown diagrammatically by the arrows $F_6$, the latter due to the weak zone 10. These expansions of the clippable body 1 resist any rotation and this in spite of an increase in the screwing torque, progressively with the descent of the screw V.

It is seen on reading FIG. 5B that, when the screw V is completely placed in position and its length is well adapted to that of the lower portion of the barrel 9 so that it does not pierce the lower end of the latter, this enables the thus-constituted nut to resolve problems of fluid-tightness, when they are required.

As can be seen, the essential principal of the invention resides in the creation of a plastics nut for use in the circular hole of a support of any part, which nut is arranged to oppose the rotation caused by the screwing torque of a screw, an opposing force sufficient by increase of the tightening of the nut caused by the bringing together of a wedge ensleeved in the upper portion and of a barrel receiving the screw, in the lower portion.

In the embodiments shown in FIGS. 1 to 5B which have just been described, the resistance to the screwing torque is obtained by the screwing itself which causes the descent of the conical wedge 2 and the reascent of the barrel 9.

According to another feature of the present invention, the resistance to the screwing torque may advantageously be completed by providing complementary means to prevent the complementary wedge 2 from rotating inside the clippable body.

These additional means may be constituted by a series of longitudinal sharp edges on the outer wall 14 of the wedge 2.

According to a first embodiment shown in FIG. 6, the sharp edges 16 are constituted by ribs with a triangular section of constant heights over their whole length, these ribs being molded at the same time as a complementary element 2 whose outer surface 14 is frustoconic.

According to a modification, the complementary element 2 is cylindrical and the sharp edges 17 are constituted by ribs with a triangular section but whose height, this time, increases from the bottom upwards of the complementary element 2.

In accordance with another design shown in FIGS. 8, 9, 10 and 11, the complementary element 2 has a generally cylindrical shape and includes one or several longitudinal slots which become adapted by sliding on one or several complementary parts provided inside the clippable body so as to create expansion of the complementary element 2 which increases progressively with the descent of the latter inside the clippable body, under the effect of the advance of the screw.

According to the embodiment shown in FIG. 8, the element 2 includes three longitudinal slots 18 which extend from the bottom of the complementary element 2 over a certain length of the latter and are distributed at 120° with respect to one another.

In accordance with the modified embodiment shown in FIG. 9, the element 2 includes a single longitudinal slot 19 which traverses it from above to below, said slot having a width greater at the base than at the head of said element.

In the embodiment shown in FIG. 10, the element 2 includes also a single longitudinal slot 20 which passes through it from above to below but said slot having a constant width over its whole length.

In accordance with the modification shown in FIG. 11, the element 2 includes in its thickness three longitudinal dove-tail grooves 21 which are distributed at 120° with respect to one another but of which one is extended in the radial direction by a longitudinal slot 22 which passes through the element 2 from above to below.

In another embodiment shown in FIG. 12, the element 2 is of a generally cylindrical shape and includes, engraved in its outer surface 14, channels 23, for example, three in number distributed at 120° from one another, these channels increasing in depth from above downwards in the element 2 and cooperating with elements, not shown, having complementary slopes provided on the inside of the clippable body 1 so as to cause the increase in expansion progressively with the descent of the screw and hence in the penetration of the element 2 inside the clippable body.

According to yet another modification shown in FIG. 13, the element 2 can include also at its lower portion of the inner bore 15, a frustoconic portion 24 which becomes enlarged on a complementary portion provided at the entrance of the bore of the solid barrel 9, which contributes to increasing the expansion, progressively with the advance of the screw hence the descent of the complementary element 2 inside the clippable body 1.

To this end, the barrel 9 of the clippable body 1 may include, as shown by way of example in FIG. 14, a central column 25 in which is formed the bore 12 serving for the self-tapping of the screw. The upper portion of this column 25 ends in a frustoconic part 26 on which the complementary frustoconic part 24 of the complementary element 2 of the type shown by way of example in FIG. 13, becomes enlarged, progressively with the advance of the screw.

It has been seen previously that it was advantageous to have the complementary wedge 2 and the clippable body 1 molded together by connecting them by a bar or strip 3.

In a modification shown in FIG. 15, it is possible to reach the same result of molding in a single operation by molding the wedge 2, including, for example, a longitudinal slot 27, directly on the head 4 of the clippable body 1 with a zone of fragility 28 or any other connection according to one of the usual well-known methods.

It is well understood that the present invention has only been described and illustrated by way of preferential example and that it would be possible to introduce equivalent elements instead of its constituent elements without however departing from the scope of said invention, which is defined in the appended claims.

I claim:

1. A plastic fastening device adapted for use in the round hole of a workpiece and further adapted to receive a screw having a predetermined diameter with high gripping torque to enable mounting of components even in thin sheet metal, said device comprising:

a hollow tubular element open at one end and having a head extending laterally at that end, said element being provided with external clipping means to thereby form a clippable element, said clippable element being clippable in the round hole of said workpiece.

a wedge-forming complementary element provided with an inner through-bore having a diameter greater than said predetermined diameter, said clippable element including a body having at its upper portion a bore whose shape is complementary to that of the complementary wedge and upon introduction of said wedge causes an internal increasing expansion of said clippable body, progressively with the penetration of said wedge, said body at its lower portion being provided with a circular bore smaller than said predetermined diameter, said upper and lower portions of said body carrying said two bores being connected together by a frustoconical zone creating a thinning zone, a mounting screw passing freely through the bore of said complementary wedge element so as to engage and tap solely the lower portion of said clippable element, the force opposing the screwing torque being obtained by the rotation of the screw itself whereby simultaneously the head of said screw exerts pressure causing the axial descent of the complementary wedge element into the upper portion of the clippable element body and the axial movement of the lower portion of said clippable element toward said open head end progressively with the advance of the screw resulting therefore in a second external expansion of the clippable body.

2. Fastening device as claimed in claim 1, in which the length of the mounting screw is adapted to the length of the lower portion of the clip element so as not to pass through the lower end of the latter and thus to ensure fluid-tightness of the whole.

3. Fastening device as claimed in claim 1, in which the resistance to the screwing torque is completed by additional means preventing the complementary wedge from rotating inside the clippable element.

4. Fastening device according to claim 3, in which the additional means are constituted by a series of longitudinal sharp edges formed in molding with the outer wall of the complementary wedge, the height of these edges above the wall being determined so that these edges present, in their length, a slope complementary to that of the bore formed in the upper portion of the clippable element.

5. Fastening device as claimed in claim 3, in which the complementary wedge takes a generally cylindrical shape and includes at least one longitudinal slot which becomes adapted by sliding, during the penetration of the wedge into the clippable element, on a complementary portion provided inside said clippable element to create an expansion of the complementary wedge progressively with the penetration of the latter into the clippable element under the effect of the advance of the screw.

6. Fastening device as claimed in claim 3, in which the complementary wedge assumes a generally cylindrical shape and includes, engraved in its outer surface, longitudinal grooves increasing in depth from the top to the bottom of the complementary wedge and cooperating with the complementary portions provided inside the clippable element so as to cause the increase in expansion progressively with the penetration of the complementary wedge into the clippable element under the effect of the advance of the mounting screw.

7. Fastening device as claimed in claim 1, in which the complementary wedge includes at the lower portion of its bore a frustoconic portion which becomes opened out over a complementary portion provided at the entrance of the bore formed in the lower portion of the clippable element, which contributes to increasing the expansion, progressively with the advance of the mounting screw, and hence the descent of the complementary wedge inside said clippable element.

8. Fastening device as claimed in claim 1, in which the clippable element and the complementary element are connected together by means of a connecting bar so as to be moldable in a single injection.

9. Fastening device as claimed in claim 1, wherein the complementary element is molded directly on the head of the clippable element with a frangible connection.

* * * * *